United States Patent [19]
Ohlsson et al.

[11] Patent Number: 5,767,491
[45] Date of Patent: Jun. 16, 1998

[54] HEATING APPARATUS FOR MAKING A CONTINUOUS LONGITUDINAL SEAM WELD ON A LAMINATED PACKAGING MATERIAL WEB

[75] Inventors: Michael Ohlsson, Malmö, Sweden; Christer Kohle, Formigine, Italy

[73] Assignee: Tetra Laval Holding & Finance S.A., Sweden

[21] Appl. No.: 584,122

[22] Filed: Jan. 11, 1996

[30] Foreign Application Priority Data

Jan. 10, 1995 [SE] Sweden ............... 9500065

[51] Int. Cl.[6] ............... H05B 6/10; B65B 9/06
[52] U.S. Cl. ............... 219/633; 219/614; 219/659; 53/55.1; 53/373.7; 53/DIG. 2; 228/49.3; 156/380.2
[58] Field of Search ............... 219/614, 612, 219/607, 603, 659, 658, 633, 61.1, 61.2, 61.13, 61.3; 53/55.1, 373.7, 451, DIG. 2; 156/380.1, 380.2; 228/49.3; 285/41

[56] References Cited

U.S. PATENT DOCUMENTS

| | | | |
|---|---|---|---|
| 1,842,461 | 1/1932 | Sessions | 219/614 |
| 1,947,089 | 2/1934 | Jones | 219/614 |
| 3,171,940 | 3/1965 | Kohler | 219/614 |
| 3,259,964 | 7/1966 | Engel | 219/614 |
| 3,526,079 | 9/1970 | Maxeiner et al. | |
| 3,767,882 | 10/1973 | Garnier | 219/614 |
| 4,043,098 | 8/1977 | Putnam, Jr. et al. | |
| 4,128,985 | 12/1978 | Simmons | |
| 4,136,505 | 1/1979 | Putnam, Jr. et al. | |
| 4,599,502 | 7/1986 | Khare et al. | 219/614 |
| 5,001,319 | 3/1991 | Holmström | |

FOREIGN PATENT DOCUMENTS

| | | |
|---|---|---|
| 0 387 512 | 9/1990 | European Pat. Off. . |
| 0 480 405 | 4/1992 | European Pat. Off. . |
| 1 178 348 | 9/1964 | Germany . |
| 177 444 | 12/1961 | Sweden . |
| 464019 | 2/1991 | Sweden . |

*Primary Examiner*—Philip H. Leung
*Attorney, Agent, or Firm*—Burns, Doane, Swecker & Mathis, L.L.P.

[57] ABSTRACT

The disclosure relates to an apparatus for making a continuous welding joint. A material web (20) formed into a tube (8) is sealed along the longitudinal joint seam in that a joint heater (1), preferably an induction heater, is disposed in parallel along the longitudinal joint seam. The sealing operation takes place continuously in a point (18) where a compression device (2) consisting of a pressure roller (9) and a counter pressure roller (10) is provided. The compression device (2) is interconnected together with the joint heater (1), to form a moving unit which may move vertically up and down in relation to the sealing point (18).

8 Claims, 3 Drawing Sheets

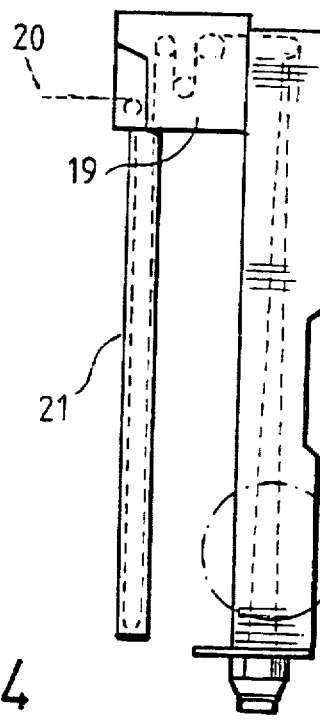
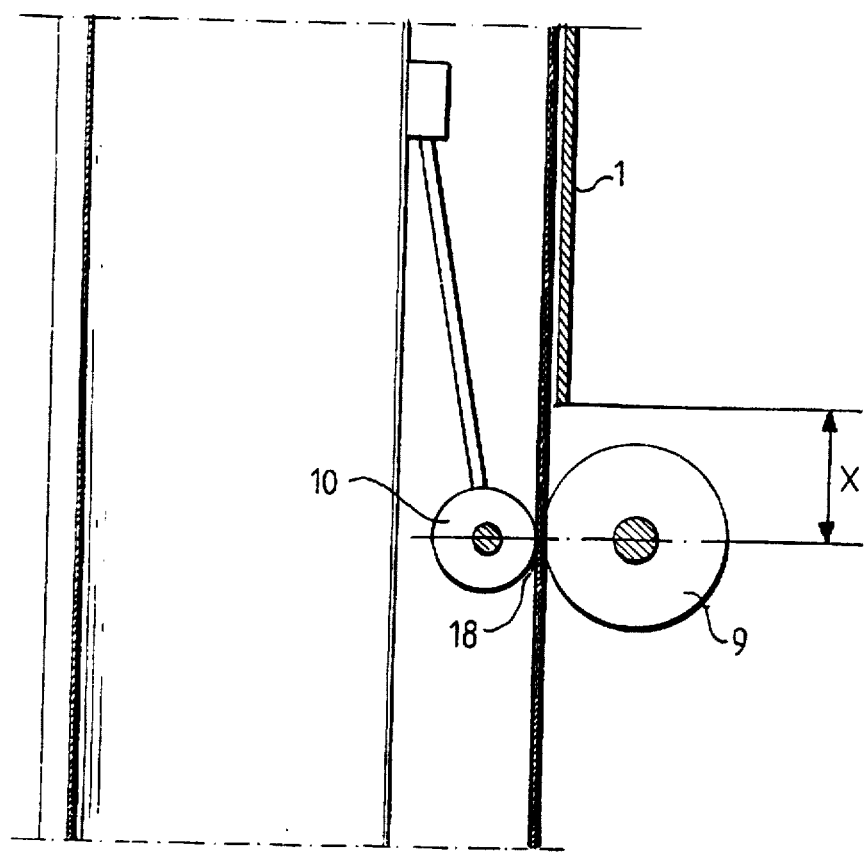

HEATING APPARATUS FOR MAKING A CONTINUOUS LONGITUDINAL SEAM WELD ON A LAMINATED PACKAGING MATERIAL WEB

TECHNICAL FIELD

The present invention relates to an apparatus for making a continuous welded joint in a longitudinal seam on a packaging material web which is continuously formed into a tube from a planar packaging materials web, the apparatus including a joint heating device.

BACKGROUND ART

It is known within the packaging industry to continuously make a seal on the longitudinal joint or seam of a tube which is formed continuously, in which operation use is made of a joint heater which consists of hot air nozzles or an induction heater.

The continuously formed tube preferably consists of a laminated packaging material in which the materials included may be layers of paper, plastic and metal.

Normally, the laminate consists outermost of a thermoplastic material, an aluminium foil and a core or carrier layer of paper. This laminate is formed from a planar packaging material web into a continuous hose or tube in which the edge zones are united by heating and fusion in a filling machine in order to produce packages for, for example, liquid foods. Patent Specification SE 464019 describes a common method for forming continuous hoses or tubes from a planar web, and for effecting the welding together of the edge zones, which preferably overlap one another, this welding being carried out with the aid of hot air. This so-called longitudinal seam welding entails that the joined thermoplastic layers in the laminate are heated to sealing or fusion temperature whereafter they are compressed continuously to form a tight seam joint.

The one edge zone is often provided with a strip of thermoplastic which is first welded or fused to the one edge zone of the material web before both of the edge zones are welded together to form a continuous tight seam joint along the tube. This is in order to obtain, within the package, a joint which is wholly covered by thermoplastic. Otherwise, the one edge of the joint will be exposed inside the package, in which event the carrier or core layer of paper or paper board in the packaging laminate will come into direct contact with the liquid in the package which may thereby penetrate into the carrier layer and partially dissolve it or damage it.

In longitudinal joint welding with hot air, use is made of a hot air nozzle which is often of elongate shape, and is disposed substantially parallel along the longitudinal joint seam. The above-mentioned hot air nozzle or hot air element takes a relatively long time to heat up and this results in long start-up time for the filling machine.

A long start-up time will also be the outcome if it has become necessary to stop the filling machine as a result of risk of overheating in the aseptic housing in the filling machine, i.e. in that space where the packaging material is located, between the sterilization bath ($H_2O_2$) and the forming operation. In addition, in short production down times in the filling machine, it is necessary to re-heat a part of the joint seam in order to obtain a continuously tight longitudinal joint without any interruptions. Today, this arrangement implies the need for a plurality of moving mechanical parts in order to realise an automatic process. When the machine is restarted, a large pressure roller which compresses the joint seam and is placed after the hot air nozzle must first be pivoted away from the longitudinal joint seam. Thereafter, a smaller support or backing roller for the tube is moved in against the tube in order to maintain the tube form at the longitudinal joint seam. Finally, a separate heating element is moved in place so as to heat up-or more precisely to reheat-the region beneath the larger pressure roller. This operation entails a complex mechanical design with various linkage arms and pivot joint systems. The design requires considerable adjustment and is expensive to maintain. Furthermore, the two hot air nozzles are constantly discharging hot air, both during continuous operation in the joint welding, and in machine or production stoppages. This also creates problems in the previously mentioned aseptic housing in the filling machine, in the event of production or machine down time. The hot air nozzle is at a temperature of several hundred degrees Celsius, which, after only a few minutes, makes the environment around the joint heater in the aseptic housing in the filling machine too hot, with the result that the packaging material or the tube might very well be damaged. Here, expensive ventilation equipment has been implemented in order to remove the excess heat. Another important aspect is that the washing process, for example with steam or lye, becomes more complicated and expensive. The hot air nozzles with several hundred air jet apertures, as well as the complicated linkage mechanism, gather plastic scrapings from the inside of the tube, together with dirt and dust, and the entire arrangement must be washed by hand, either inside or outside the filling machine, which is a circumstantial operation entailing extra costs. This is a further disadvantage, given that hygiene is extremely important in the handling of liquid foods. A further hygienic aspect must be mentioned. The hot air nozzle is disposed between the two overlap edge zones of the tube. This entails that the nozzle occasionally scrapes against the inside of the packaging material. Such scratches can give rise to leakage with consequential loss of sterility in the package.

Patent Specification SE 464019 discloses a method of carrying out longitudinal joint seam welding by means of induction heating. In such instance, the above-mentioned tube and its longitudinal joint seam run substantially parallel with and between two inductor plates on an inductor. In this type of longitudinal joint sealing, an aluminium layer embodied in the laminate is utterly indispensable.

The aluminium foil will now be heated in a pattern corresponding to the configuration of the inductor loop or coil and, by suitably selected current strength, frequency and processing time, the material can be heated to the desired temperature, i.e. a temperature which is sufficiently elevated for adjacent layers of thermoplastic to be heated to the sealing or fusion temperature, whereupon the united thermoplastic layers are caused to fuse together to one another for obtaining a tight and durable seal. One problem in this instance is however that dust and dirt may accumulate on the inductor plate which is placed on the inside of the tube. This can cause damage to the inside of the packaging material in the filling machine. Such damage to the thermoplastic layer and the aluminium foil may cause liquid to leak into the carrier or paper layer in the packaging material, which can be seen in the form of blotches or spots on the filled package. This gives a loss of sterility, with expensive rejection of packages as a result. This type of induction heater has further proved to be difficult to adjust in order to achieve the correct placing of the formed heating zone. The two edge zones are to run in between the inductor plates at the same time as the tube is formed from a planar packaging material web. This is technically complicated to achieve, in particular if the tensile force acting on the tube varies. This can result in variations in the size of the overlap of the two edge zones on the packaging material, as well as a varying or uneven heating along the edge zones.

OBJECTS OF THE INVENTION

One object of the present invention is to realise an apparatus for longitudinal joint seam welding which does not suffer from the drawbacks inherent in prior art apparatuses, the apparatus according to the present invention further having fewer parts and thereby being simpler and more economical to manufacture. Fewer parts in the apparatus is an advantage, since service and maintenance, as well as washing and sterilization of the welding apparatus all become simpler. This is particularly important in packaging machines of the type which fill previously sterilized contents into a sterile package.

A further object of the present invention is to realise a welding apparatus which is gentle on the inside of the tube, so that the risk of damage to the packaging material with consequential loss of sterility is avoided.

Yet a further object of the present invention is to make the welding apparatus according to the invention simple to adjust and govern in respect of the position and efficiency of the heating zone in order thereby to reduce the number of packages which must be rejected as a result of untight joint seals.

SOLUTION

These and other objects have been attained according to the present invention in that the apparatus of the type disclosed by way of introduction has been given the characterizing feature that the apparatus also includes a compression device with a pressure roller and a counter pressure roller, disposed to define a sealing point where the compression device and the joint heater are interconnected to form a moving unit, which is operative to reciprocate, by drive means, substantially vertically in relation to the sealing point.

Preferred embodiments of the welding apparatus according to the invention have further been given the characterizing features as set forth in the appended subclaims.

BRIEF DESCRIPTION OF THE ACCOMPANYING DRAWINGS

The present invention will now be described in greater detail hereinbelow, with particular reference to the accompanying Drawings, in which:

FIG. 3 shows how the packaging material passes the heating zone of the induction heater in order subsequently to be compressed into a joint between the pressure roller and the counter pressure roller; and FIG. 4 shows a part of the filling machine in cross section, as well as the path of the packaging material through the filling machine.

DESCRIPTION OF PREFERRED EMBODIMENT

Figure 1:
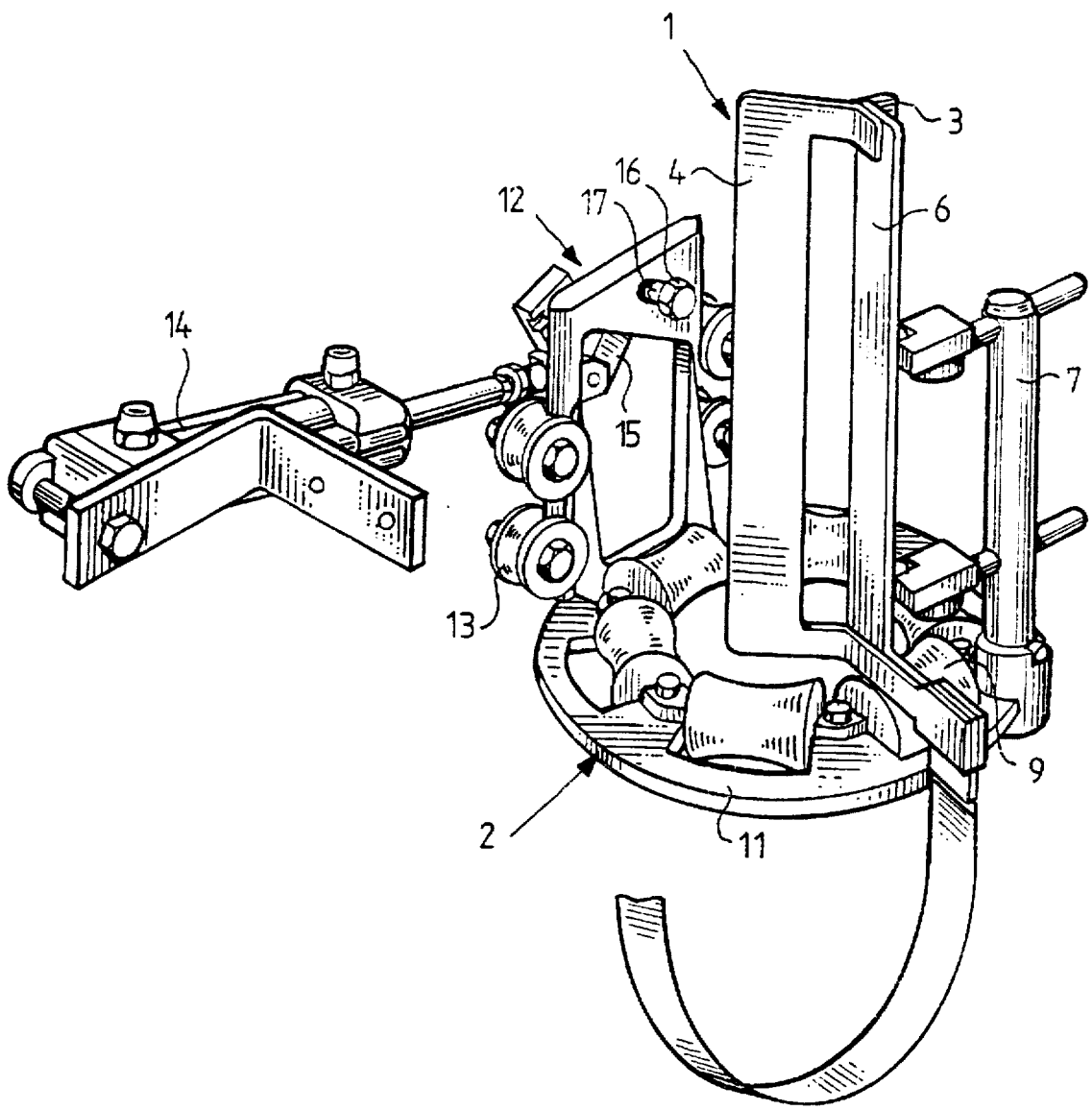
FIG. 1 shows the apparatus according to the present invention.
Figure 2:
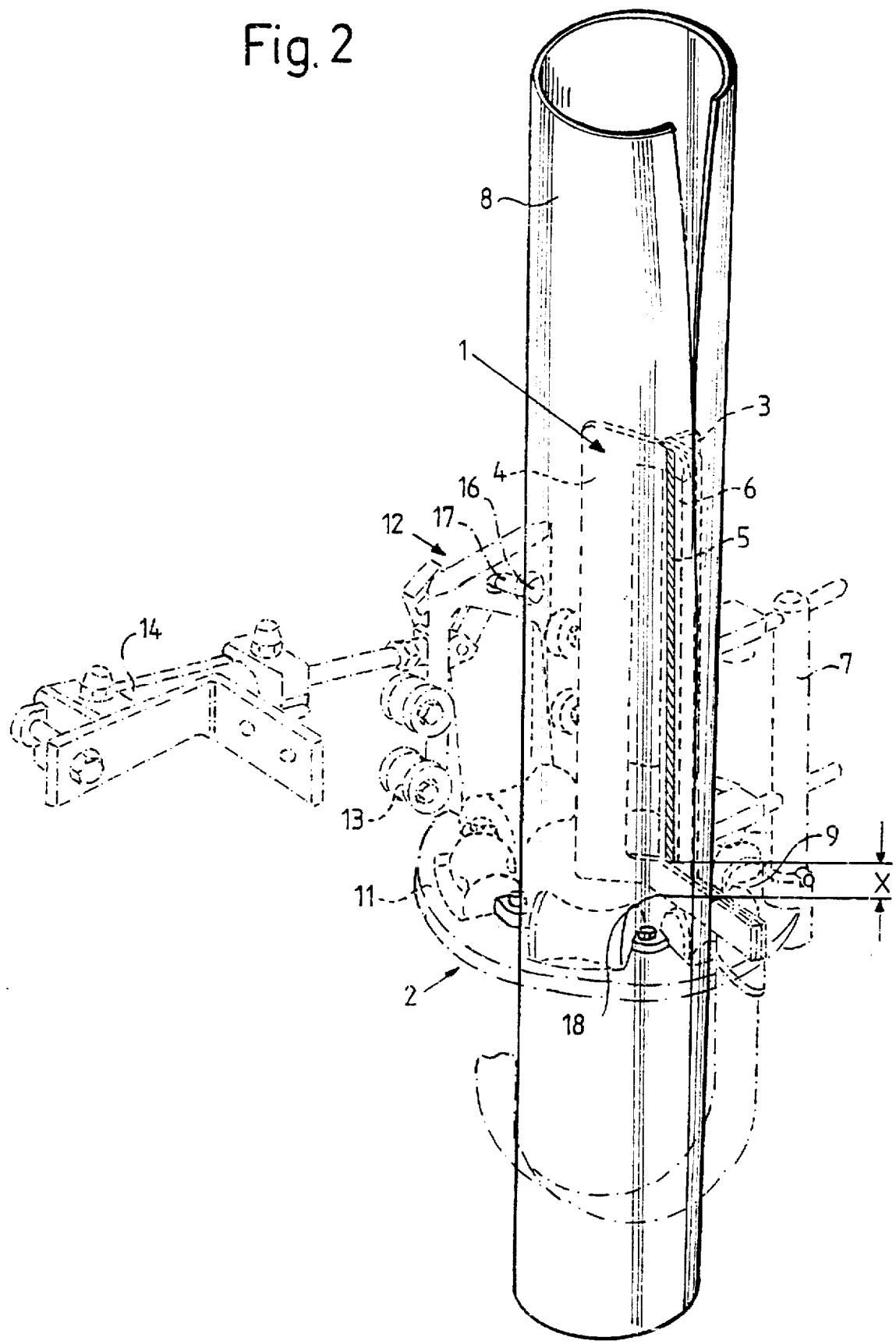
FIG. 2 shows the apparatus in the welding of a continuous tube.

FIGS. 1 and 2 show a welding apparatus according to the invention comprising a joint heater 1, preferably an induction heater, interconnected with a compression device 2. In the preferred embodiment, the induction heater 1 consists of an inductor divided into two parts, a narrower portion 3 and a wider portion 4, connected to an a.c. current source (not shown), a so-called IH generator, from which it is possible to obtain constant power which can be governed for an optimum welding process. A clearly defined heating zone 5 is formed substantially behind the narrower inductor portion 3. The heat loss in the metal plates 3 and 4 is relatively slight, for which reason there are but negligible problems involved in heat emission to the ambient environment. This implies that the apparatus can be placed in a filling machine without needing to take into account the factor that waste heat must be led off via expensive and complicated ventilation or cooling arrangements.

The above-disclosed inductor portions 3 and 4 are discretely insulated from one another by a spacer or guide rail 6 preferably of plastic. This acts as a retainer device for the induction heater 1 at the compression device 2 via a bracket 7, or alternatively with a direct coupling between the rail 6 and the compression device 2, depending upon the appearance of the rail 6 or the compression device 2. The rail 6 further ensures that the tube 8 continuously formed from the planar packaging material is located at a constant distance from the inductor portions 3 and 4 so that the tube 8 is not damaged by direct contact with these portions or plates 3, 4, and that a constant power effect can be induced in the aluminium layer of the tube 8.

The narrower inductor portion 3 of the two substantially elongate portions 3 and 4 is disposed parallel with the longitudinal joint seam on the tube 8 so that its heating zone is concentrated substantially to the area where the longitudinal joint seam of the tube 8 has overlapping edge zones. Furthermore, the device 2 is disposed in register with and above a pressure roller 9 which is disposed to press from the outside of the longitudinal joint seam of the tube 8 continuously heated to sealing or fusing temperature, at the same time as a preferably spring-biased counter pressure roller 10 presses from the inside of the tube 8 in register with the pressure roller 9 so that a tight joint is formed.

In its preferred embodiment, the compression device 2 consists of a plurality of pressure rollers 9 which are here journalled along the annular periphery in recesses in a forming ring 11. The device also includes a guide and retainer fitting 12 which is movably disposable thereby to reciprocate the compression device 2 and the induction heater 1 in the vertical direction. The guiding in the vertical direction is ensured by means of provided grooved rollers 13, whose arrangement exclusively permits the retainer 12 (and thereby the entire welding apparatus) to move in the vertical direction. A cylinder and piston assembly 14 is provided preferably outside or behind the closed aseptic space 19 in the filling machine, where the apparatus is located. This piston and cylinder assembly, or drive means, has a piston of a given stroke length. By the intermediary of a linkage system 15, the piston acts on a stud bolt 16 which, in the preferred embodiment, moves reciprocally up and down in a groove track 17 in the retainer fitting 12. The groove track 17 may be obliquely inclined so as to permit run-off when the welding apparatus is foam washed in the filling machine. The upward and downward movement of the stud bolt 16 thus actuates the entire apparatus to move correspondingly. The distance which the welding apparatus moves is determined by the stroke length of the piston.

The point between the pressure roller 9 and the counter pressure roller 10 is defined as a sealing point 18. FIGS. 2 and 3 disclose a distance x defined as the distance between the lower definition of the heating zone 5 of the induction heater 1 and the sealing point 18. When, for some reason, production stoppage becomes necessary in the filling machine, the longitudinal joint seam weld will have been carried out up to the sealing point 18.

When a filling machine is in operation, a planar packaging material web 20 is continuously conveyed through a hydrogen peroxide bath 21 for sterilization. Thereafter, the packaging material web 20 enters into the so-called aseptic housing 19 of the filling machine where, via diverse guide rollers and forming rings, the web is duly formed into a tube 8. The tube 8 is led in ahead of the induction heater 1 and on down through the compression device 2. The longitudinal joint seam of the tube 8, with preferably overlapping edge zones, runs at constant spacing from the induction heater 1, as ensured by the rail 6. A clearly defined heating zone 5 in respect of width and power output is induced by means of the IH generator in the aluminium foil layer in the packaging laminate 20 most proximal the narrower portion 3 of the inductor. In such instance, the aluminium foil is heated so that the adjacent thermoplastic layer makes it possible for the edge zones to be pressed together for the formation of a tight joint seal, in that the compression proper takes place at the sealing point 18 between the pressure roller 9 pressing from outside and the counter pressure roller 10 pressing from the inside of the tube 8.

When, for some reason or other, production stoppage becomes necessary in the filling machine, a weld will have been made up to the sealing point 18.

In the event of production stoppage or machine down time, the hydrogen peroxide bath 21 for sterilizing the planar packaging material web 20 must occasionally be emptied. During machine down time or brief stoppage, a distance x between the sealing point 18 and the lower edge of the heating zone 5 of the induction heater 1 will have had time to cool. Before welding of the longitudinal joint seam is recommended, hydrogen peroxide is once again replenished into the filling machine, and the induction heater 1, together with the compression device 2, the pressure roller 9 and the counter pressure roller 10 move at least the abovementioned distance x downwards along the longitudinal joint seam, and reheat this distance x, whereafter the unit moves back a corresponding distance upwards so as to seal the distance x. When the welding apparatus has reached its upper starting position, the tube 8 once again begins its downward movement and the now stationary welding apparatus heats and continuously seals the longitudinal joint seam on the tube 8, whereafter filling of liquid food, transverse sealing and separation of filled packages may take place. On restart of the filling machine, heating of the distance x takes place at the same time as other starting processes are commenced in the filling machine, for example towards the end of the replenishment operation for the hydrogen peroxide. This means that the heating of the longitudinal joint distance x by means of the vertical reciprocation of the welding apparatus immediately prior to starting the downward movement of the tube 8 does not take so much time as to prolong the start-up time overall. The parts for the welding apparatus may be of non-corrosive material, which, in addition, is resistant to the normally employed washing and sterilizing agents such as soda lye and steam.

Thus, the apparatus according to the present invention constitutes a simple design with few moving parts. This makes for an economical design which can be foam washed automatically in place in the filling machine. This simplifies the cleaning process considerably as compared with manual washing. Maintenance is simpler and cheaper, as well as adjustment of the position and power output in respect of the heating zone. Damage to the inside of the tube is eliminated and thereby also the risk that filled, but unsterile, packages are produced.

The present invention should not be considered as restricted to that described above and shown on the Drawings, many modifications being conceivable without departing from the spirit and scope of the appended claims.

What is claimed is:

1. An apparatus for making a continuous welding joint on a longitudinal seam in a material web which is continuously formed into a tube from a planar packaging material web including a paper core, laminated layers of plastic, and a metal foil layer, the apparatus comprising:

a joint heater, a compression device with a pressure roller and a counter pressure roller disposed to define a sealing point, said compression device and said joint heater being interconnected to form a movable unit which is operative, drive means for substantially vertically reciprocating said movable unit in relation to the sealing point.

2. The apparatus as claimed in claim 1, wherein the joint heater includes an induction heater connected to an a.c. current source, said joint heater being disposed substantially parallel with the longitudinal joint seam.

3. The apparatus as claimed in claim 2, wherein the induction heater is disposed such that a heating zone is formed substantially along a first inductor portion and a second inductor portion of said induction heater.

4. The apparatus as claimed in claim 1, wherein the compression device includes a forming ring with a plurality of forming rollers journalled in a plate along the annular periphery of the forming ring.

5. The apparatus as claimed in claim 1, wherein the pressure roller comprises at least one pressure roller disposed at the sealing point so as to press from one side of the longitudinal joint seam, at the same time as the counter pressure roller is disposed to press from an opposite side of the longitudinal joint seam.

6. The apparatus as claimed in claim 5, wherein the counter pressure roller is a spring-biased pressure roller.

7. The apparatus as claimed in claim 1, wherein said drive means includes a piston and cylinder assembly which is disposed to actuate the movement of said unit by an intermediary of a linkage system.

8. The apparatus as claimed in claim 1, wherein, after a stoppage of the apparatus, said drive means vertically reciprocates said movable unit downward prior to feeding of the material web such that a longitudinal distance of the tube between said sealing point and a lower edge of said joint heater may be reheated prior to passing through said compression device.

* * * * *